J. H. LUBBERS.
PROCESS AND APPARATUS FOR DRAWING GLASS.
APPLICATION FILED NOV. 2, 1908.
926,501.
Patented June 29, 1909.
2 SHEETS—SHEET 1.
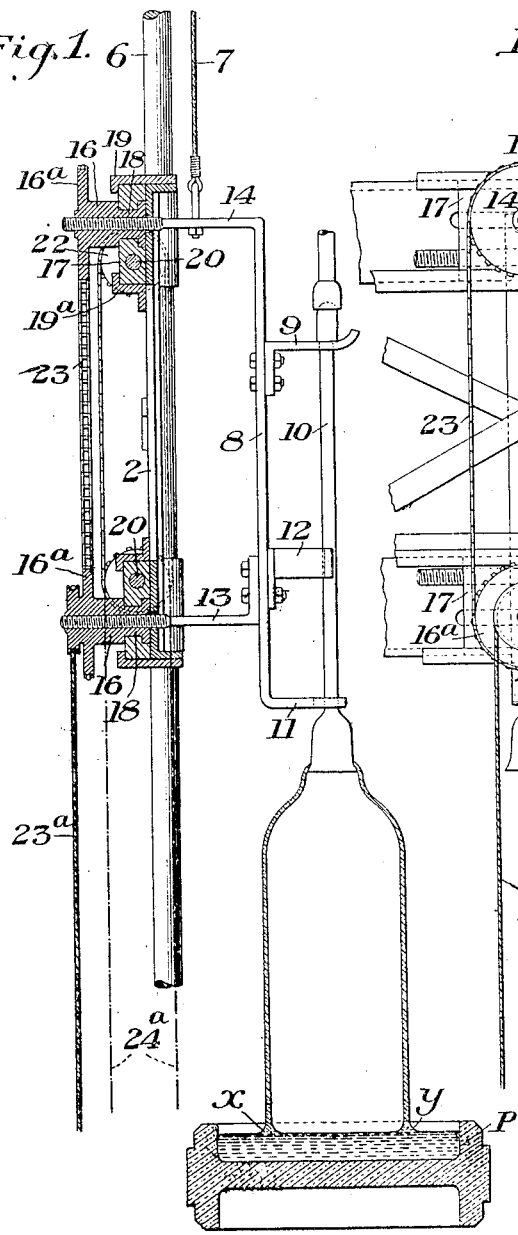
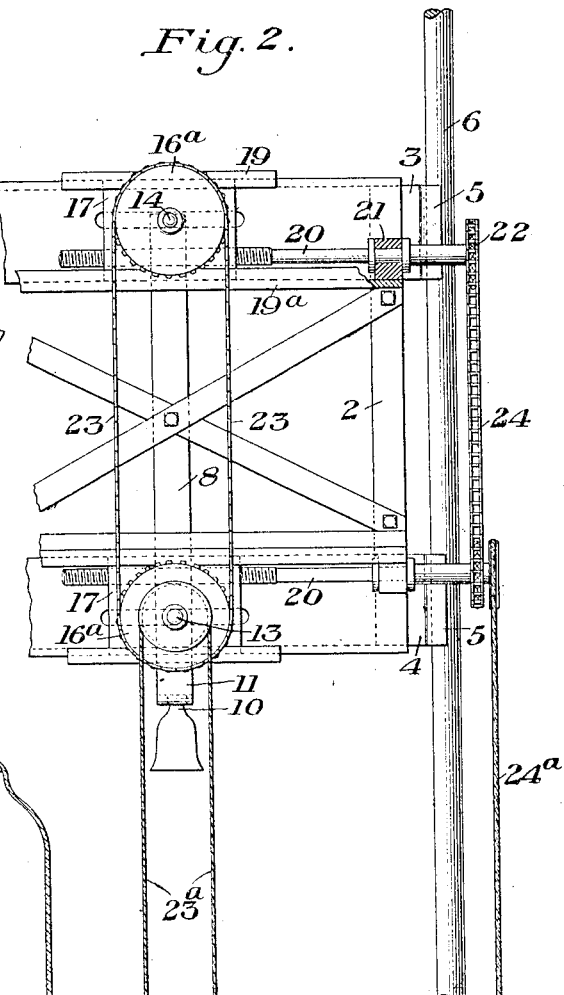
WITNESSES
INVENTOR;
John H. Lubbers J. H. LUBBERS.
PROCESS AND APPARATUS FOR DRAWING GLASS.
APPLICATION FILED NOV. 2, 1908.

926,501.

Patented June 29, 1909.
2 SHEETS—SHEET 2.

WITNESSES
Chas. S. Lepley
Henry Sens

INVENTOR
John H. Lubbers
By J. W. H. Clay
his atty.

UNITED STATES PATENT OFFICE.

JOHN H. LUBBERS, OF PITTSBURG, PENNSYLVANIA, ASSIGNOR TO WINDOW GLASS MACHINE COMPANY, OF PITTSBURG, PENNSYLVANIA, A CORPORATION OF NEW JERSEY.

PROCESS AND APPARATUS FOR DRAWING GLASS.

No. 926,501.      Specification of Letters Patent.      Patented June 29, 1909.

Application filed November 2, 1908. Serial No. 460,561.

*To all whom it may concern:*

Be it known that I, JOHN H. LUBBERS, a citizen of the United States, residing at Pittsburg, in the State of Pennsylvania, have invented certain new and useful Improvements in Processes and Apparatus for Drawing Glass, of which the following is a specification.

My invention relates to the art of mechanically forming glass articles, by drawing upward from a receptacle of molten glass, and its primary object is to render the product more uniform and to more easily control the operation of drawing.

The invention is illustrated in the accompanying drawings, wherein—

Figure 3:
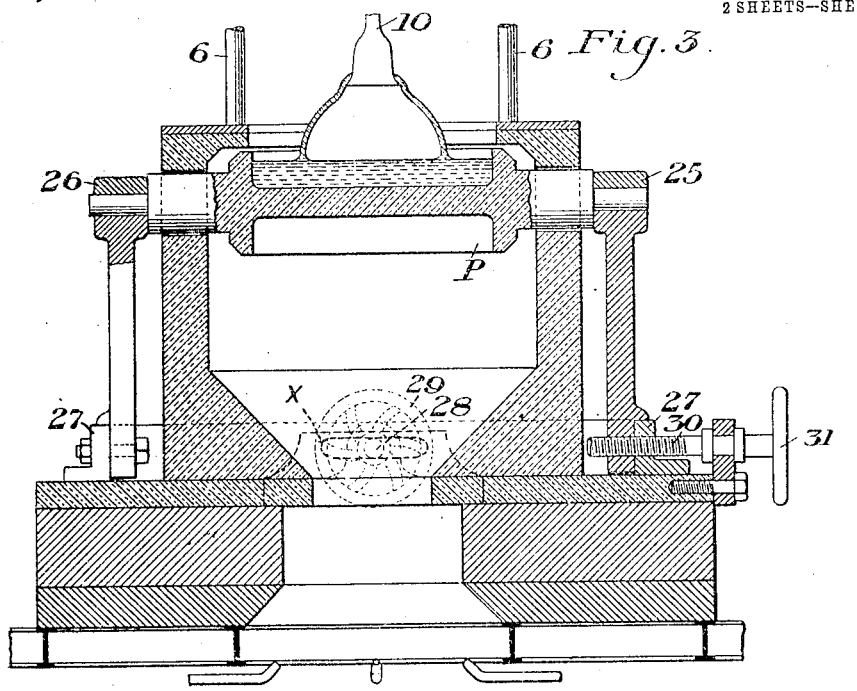
Figure 4:
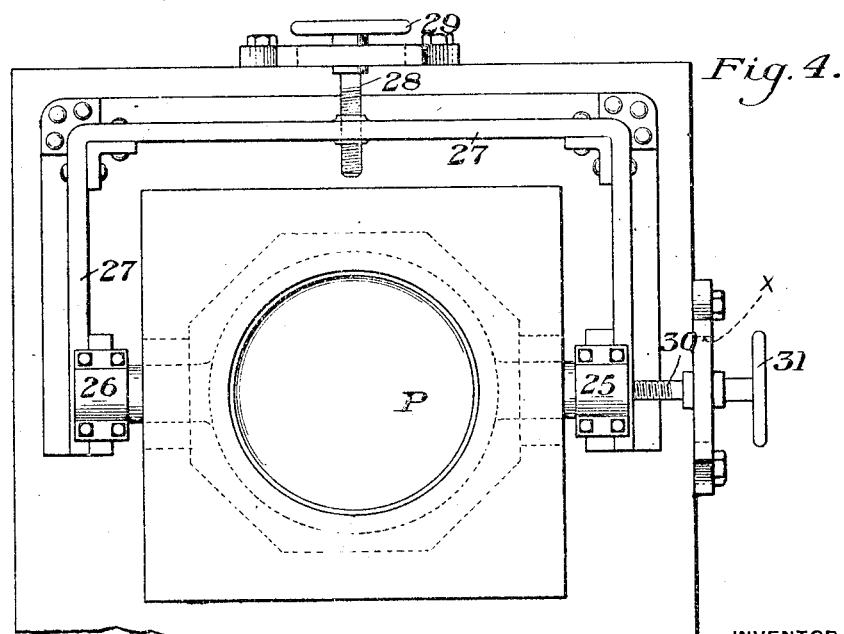

Figure 1 is a side elevation and partial vertical section of one form of apparatus for carrying out the invention, and Fig. 2 is a front elevation of the same. Fig. 3 is a vertical central section of certain parts of a modified apparatus, and Fig. 4 is a plan view of a drawing pot and furnace.

In the practice of this art, it has been found difficult to make the glass of the same thickness throughout the area of a cylinder or sheet, and much trouble has been experienced by reason of the so-called thick-and-thin glass. That is, in drawing cylinders for example, the glass is found to be thicker at one portion of the circumference than at another. It will be understood that this is objectionable on account of the breakage to which it gives rise, both during the drawing and in subsequent treatment, on account of the difficulty of properly flattening such a glass when made from cylinders, on account of causing waste in cutting, and for various other reasons. Experience has shown that there are various causes of this defect, among which may be mentioned the fact that in ladling into a refractory pot the consistency of the glass may be different in different parts of the pot; that the temperature of the pot itself may be different at different points on the sides; that the pot may be out of level, so that the drawing depth is not uniform over the area; the character of the materials in the walls of the pot may vary; and other causes of various kinds may cause the thick-and-thin drawing of the glass. I have found that whatever the cause of the difficulty, it may generally be corrected by adjusting the surface tension of the glass in the containing receptacle; and that this surface tension may be controlled by varying the distance of the point of draw from the walls of the pot, at various points: in short, that when an article is being drawn thick-and-thin the fault can be corrected and the thickness made uniform by adjusting the relative positions of the drawing pot and the drawing devices as the bait or blow pipe travels upward drawing the glass with it. The importance of this discovery will be appreciated from considering that the conditions under which glass drawing is carried on are almost certain to vary, and depend very largely upon the skill and familiarity of the workmen. For example, where glass is ladled from tanks into drawing pots, one ladler may be accustomed to dipping out from a certain locality in the melting tank, while his successor on the next shift may be accustomed to dipping from a different locality. Also the character of the glass in the pot is very dependent upon the way it is poured in by the ladler. It is also dependent upon the condition of the heating apparatus under the pot, upon air currents, upon the position of the pot, and various other conditions involved in the operation. For some time it was not understood why one cylinder or sheet would draw correctly and the next would be drawn thick and thin,—which often happened even with the same workmen employed in the manipulation. I have found however, that the thickness of the glass drawn up in forming a cylinder or sheet is not only largely dependent upon the conditions of surface tension, but that the thickness can be easily controlled by varying and adjusting the surface tension.

Of course the adjustment of relative positions of the containing receptacle for the molten glass and the drawing mechanism can be made from time to time after its necessity becomes apparent from examining the product and while the actual drawing operation is not in progress; but it is often desirable to correct irregularities at once and during the drawing of the article. Such irregularities, particularly in drawing cylinders, can easily be detected by the eye as soon as the cap is formed.

In Figs. 1 and 2, I show a drawing carriage comprising a frame with side bars 2, 2, and top and bottom bars 3, 4 provided with guide blocks 5 which it will be understood travel over the vertical guide bars 6, as the frame is raised by any convenient means such as a cable 7. On this frame is a supporting bar 8 from which projects forwardly a hook 9, upon which the blow-pipe 10 is hung, while the lower end of the pipe rests in a slotted guide 11 and is steadied by an intermediate spring 12. The bar 8 has rearwardly projecting rods 13, 14, which are threaded and, passing freely through horizontally elongated slots in the bars 3, 4 of the frame, are engaged by threaded sleeves 16. These sleeves are held against to-and-fro motion by block 17, engaging annular grooves 18 in the sleeve. At the same time the block 17 is slidable sidewise in guides 19 19$^a$, and for giving it lateral motion in either direction I may conveniently employ a screw 20 mounted in the block 21 on the frame, as shown in Fig. 2. These screws 20 have sprocket wheels 22, over which pass operating chains 24; and likewise the sleeves 16 have sprocket wheels 16$^a$ provided with chains 23. Thus by turning the sleeves 16$^a$, the blowpipe and bait will be gradually moved to and from the position of vertical alinement of the traveling frame 3, 4: and by turning the screws 20 the bait and blow-pipe will be laterally moved with respect to the frame, so that by the combined motions the relative positions of the bait and the pot P containing the glass, may be adjusted in any direction. The sprockets 16$^a$ and 22 are moved by cords 23$^a$ and 24$^a$ in pulleys on the shafts 16 and 20, and these cords preferably hang down so that they are at all times in easy reach of the operator, so that thus the adjustment can be readily made at any time without interfering with the motion of the carriage and blow-pipe.

As soon as the draw is started and the cap formed on the blow-pipe, the relative thickness at various parts of the cylinder circumference may easily be seen at the points marked $x$ and $y$, Fig. 1, and if the sides are not uniform the thickness is at once adjusted by slowly manipulating the cords 23$^a$, 24$^a$, correcting the inequalities by altering the distances of the drawing point from the wall of the pot, thus changing the area of the surface skin which is being drawn up to form the cylinder.

In Figs. 3 and 4, I have supposed the bait carriage for bait 10 to travel in a fixed vertical alinement; but the pot P is made adjustable in position by reason of its bearings 25, 26, supported on base 27, being movable in any direction by the combined action of the screws 28 and 30, respectively provided with hand-wheels 29 and 31, the bearings of the screws 28 and 30 being slidably mounted by slots X.

It will be understood however, that I am not limited to any particular method or means for accomplishing the adjustment; it may be done not only by changing the relative positions of pot and bait, but by changing the level of the bottom of the pot, or varying temperature conditions either in the furnace or on the glass surface, etc. That is, any method or means for adjusting the surface tension of the glass from which an article is being drawn is within the scope of my invention. For I believe I was the first not only to discover that the surface tension may be varied by these relative movements and adjustments above described, but also the fact that thick-and-thin drawing was due to unequal surface tension, and could be corrected by adjusting the surface tension.

Having thus described my invention and illustrated its use, what I claim as new and desire to secure by Letters Patent, is the following:

1. In the process of drawing glass, the step which consists in adjusting the surface tension of the molten glass from which the article is drawn, during the progress of the draw, substantially as described.

2. In the process of drawing glass the step which consists in adjusting the surface tension of the mass of molten glass during the drawing operation by changing the relative positions of the glass containing vessel and the drawing bait, substantially as described.

3. In the art of drawing glass articles, the process of adjusting the surface tension to correct inequalities by changing the position of the drawing point with relation to the sides of the vessel containing the molten glass, substantially as described.

4. In the art of drawing glass cylinders the process of adjusting and equalizing the thickness around the circumference by altering the distance of the drawing position from the walls of the vessel containing the molten glass during the progress of the draw, substantially as described.

5. In glass drawing apparatus, a glass-holding receptacle, and a drawing device, said parts being mounted for lateral adjustment, relative to each other, and means to effect the adjustment without stopping the drawing motion, substantially as described.

6. In glass drawing apparatus, the combination with a glass holding receptacle, of a drawing device and means to adjust said device laterally relatively to the receptacle while it is in motion, substantially as described.

7. Glass drawing apparatus comprising means for adjusting the relative positions of the glass containing receptacle and the drawing devices during and without interrupting the motion of the latter, substantially as described.

8. The combination with a receptacle for containing molten glass, and devices for drawing an article upward therefrom, of means for adjusting the surface tension of the molten glass during the drawing operation, substantially as described.

9. In apparatus for drawing glass articles, means for adjusting the surface tension of the body of molten glass being drawn from, comprising mechanism to relatively move the drawing devices laterally during their motion upward from the body of glass, substantially as described.

In testimony whereof I have hereunto signed my name in the presence of the two subscribed witnesses.

JOHN H. LUBBERS.

Witnesses:
H. M. CORWIN,
G. B. BLEMING.